(12) United States Patent
Schliemann et al.

(10) Patent No.: US 6,763,586 B2
(45) Date of Patent: Jul. 20, 2004

(54) METHOD OF PRODUCING A CRANK ARM FOR A CRANKSHAFT

(75) Inventors: Harald Schliemann, Waiblingen (DE); Arno Roos, Waiblingen (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 10/118,633

(22) Filed: Apr. 8, 2002

(65) Prior Publication Data

US 2002/0152613 A1 Oct. 24, 2002

(30) Foreign Application Priority Data

Apr. 19, 2001 (DE) .......................................... 101 19 161

(51) Int. Cl.$^7$ ................................................. B23P 15/00
(52) U.S. Cl. ..................................... 29/888.08; 72/335
(58) Field of Search ................. 29/888.08; 74/596–603; 72/335; 123/197.4

(56) References Cited

U.S. PATENT DOCUMENTS

| | | | |
|---|---|---|---|
| 4,546,670 A | * 10/1985 | Gaspardo .................... | 74/595 |
| 4,565,169 A | * 1/1986 | Suzuki ..................... | 123/192.3 |
| 4,569,316 A | * 2/1986 | Suzuki ..................... | 123/192.3 |
| 4,641,546 A | * 2/1987 | Mettler ........................ | 74/598 |
| 4,712,436 A | * 12/1987 | Brown ..................... | 123/193.2 |
| 5,408,745 A | * 4/1995 | Tomiyama et al. ...... | 29/888.08 |
| 5,435,059 A | * 7/1995 | Chawla ................... | 29/888.08 |
| 6,199,275 B1 | * 3/2001 | Goitsuka et al. | |

FOREIGN PATENT DOCUMENTS

| | | |
|---|---|---|
| DE | 3441235 C2 | 5/1986 |
| GB | 2168458 | * 6/1986 |

* cited by examiner

Primary Examiner—I Cuda Rosenbaum
(74) Attorney, Agent, or Firm—R W Becker & Associates; R W Becker

(57) ABSTRACT

A method is provided for producing a crank arm for a crankshaft of an internal combustion engine, wherein the crankshaft is composed of separately produced parts. The crank arm is stamped out of a semifinished part and has a central recess for receiving a shaft journal of the crankshaft, and has an eccentrically disposed recess for receiving a crankshaft pin. A peripheral contour of the stamped part delimits a flywheel member of the crank arm. A recessed surface portion is formed or stamped in the crank arm in an area surrounding the central recess.

11 Claims, 4 Drawing Sheets

METHOD OF PRODUCING A CRANK ARM FOR A CRANKSHAFT

BACKGROUND OF THE INVENTION

The present invention relates to a method of producing a crank arm for a crankshaft of an internal combustion engine, especially for a manually-guided implement such as a power chain saw or the like, wherein the crankshaft is composed of separately produced parts.

DE 34 41 235 C2 discloses a fabricated crankshaft for small internal combustion engines, according to which shaft journals, crank arms and crank bolts are produced separately and are subsequently joined together. Provided in the crank arms are recesses for receiving crankshaft pins and crank bolts. In this connection, a central recess is provided for receiving the shaft journals of the crankshaft on an axis of rotation thereof, and an eccentric recess is provided for receiving the crank bolt at an appropriate spacing relative to the axis of rotation at the level of the central recess. The crank arms of the known arrangement are stamped out of band steel, whereby with the stamped-out contour a flywheel member is defined that is formed on that side of the central recess that is disposed opposite the eccentric recess. In this manner, in conformity with the function of the flywheel member for counterbalancing during crank drive of the internal combustion engine, in the installed state the flywheel member is disposed oppositely from the eccentrically disposed crankshaft pin. The recesses for the crankshaft pin and for the crank bolts are, with the known method, also stamped out of the band steel as is the contour of the crank arm. By means of the stamping process, it is possible in a simple manner, and therefore economically, to stamp out of band steel, in successive stamping processes, a plurality of crank arms. The joined together crankshaft with stamped crank arms enables a multi-purpose and hence economical construction of crank drives for internal combustion engines for driving manually-guided implements such as power chain saws.

The crank arms that are stamped out pursuant to the known method have the same thickness over their entire surface, which corresponds to the thickness of the band steel from which the crank arms were stamped. The arms that are stamped pursuant to the known method are then used for crank arms having simple shapes. However, if counterbalancing is to be improved, the known arms would have to be supplemented by reinforced or thicker wall portions. The thickened wall portions for counterbalancing were attached to the stamped arms as additional components, whereby in the aforementioned DE 34 41 235 C2 sintering was proposed as a joining process for the thicker wall portions.

It is therefore an object of the present invention to improve a method of the aforementioned general type in such a way that stamped crank arms having an improved counterbalancing effect can be produced with simple means.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Pursuant to the present invention, a recessed surface portion is formed or stamped in the crank arm, in an area surrounding the central recess for the shaft journals of the crankshaft, as a result of which the thickness of the crank arm in the region of the axis of rotation is less than the thickness in the outwardly disposed region. As a result of the forming or stamping of the recessed surface portion, there results a relative accumulation of material in the outwardly disposed regions of the crank arm in relationship to the overall weight. The moment of inertia of the crank arm, which increases to the third power with the respective spacing of the mass particles from the axis of rotation, is considerably increased by the stamping in the region of the central recesses and hence of the axis of rotation of the crank arm. By suitable selection of the depth of the stamping, crank arms having different moments of mass inertia can also be produced for a given surface area. Thus, crank arms that are easy to produce are available for an optimum counterbalancing for crank drives having varying crank characteristics. An influencing of the balancing can be undertaken in a particularly advantageous manner by the shape of the stamped-in, recessed surface portion of the crank arm. The shape of the inventive stamping is determined taking into consideration the desired balancing of the crank arm and its effect upon the operating behavior of the internal combustion engine.

The stamping-in of the recessed surface portion is expediently effected prior to stamping out the contour of the crank arm from the semifinished part. In a particularly advantageous manner, the recesses having the necessary measures for receiving the shaft journals or crankshaft pins are stamped out after the stamping of the recessed surface portion, thus ensuring the exactness of fit of the recesses. Uncontrolled migrations of the material that is pressed or squeezed during the stamping are precluded if the recesses are stamped out prior to the stamping of the recessed surface portion and after such stamping process a stamping out of the recesses is repeated. In this way, the material that during stamping is displaced in the direction of the recesses can be cut off. The required cross-sectional areas of the recesses having the prescribed dimensions are produced during the second stamping process.

Further specific features of the present invention will be described in detail subsequently.

DESCRIPTION OF PREFERRED EMBODIMENTS

Figure 1:
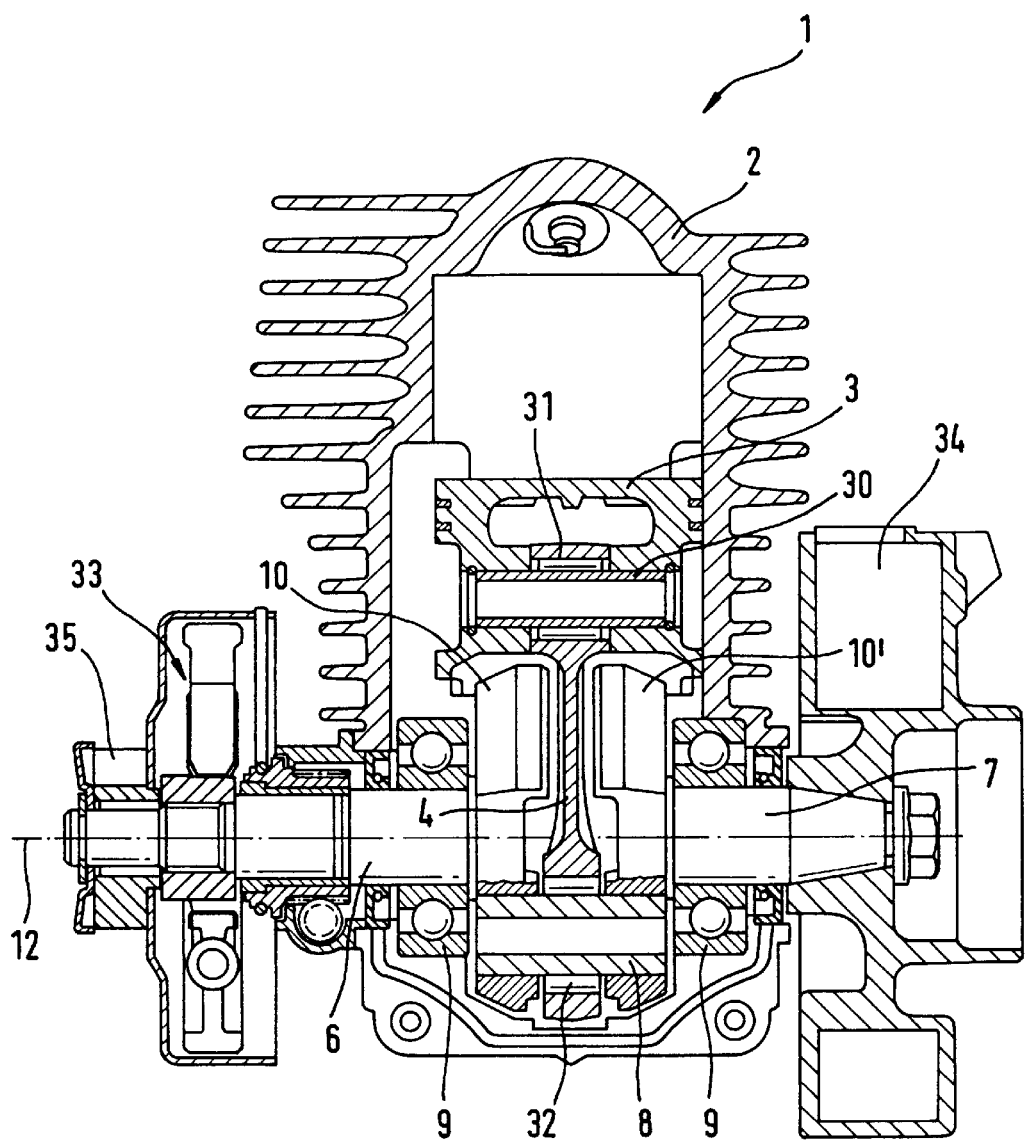
FIG. 1 is a longitudinal cross-sectional view through an internal combustion engine having a crankshaft that is composed of individual parts.

Referring now to the drawings in detail, FIG. 1 shows a one-cylinder internal combustion engine 1, which is preferably embodied as an air-cooled, two-stroke engine for driving the tool of a non-illustrated implement, such as a power chain saw, cut-off machine, brush cutter, trimmer, or the like. Longitudinally movably guided in the cylinder 2 of the engine 1 is a piston 3 that, in a crank drive, rotatably drives a crankshaft about an axis of rotation 12. For this purpose, one end of a connecting rod 4 is pivotably held on the piston 3 in a bearing 31 via a wrist pin 30. The other end of the connecting rod 4 is pivotably mounted in an offset portion of the crankshaft, mainly via a crankshaft pin 8 that is disposed in a journal bearing 32 eccentrically relative to the axis of rotation 12. Provided on both sides of the connecting rod 4 are crank arms 10, 10', which, for counterbalancing the crank drive, are provided with flywheel members that are disposed in an angular position that is diametrically opposite the crankshaft pin 8.

The crankshaft is composed of a plurality of individual parts, and is provided with two coaxially disposed shaft journals 6, 7 that therefore rotate about the common axis of rotation 12; the facing ends of the shaft journals respectively engage in separately produced crank arms 10, 10'. As a consequence of the eccentrically disposed crankshaft pin 8, which is pivotably mounted in each of the crank arms 10, 10', the shaft journals 6, 7 are kinematically coupled. Accompanied by the interposition of a centrifugal clutch 33, the shaft journal 6 drives a pinion 35, which acts upon the tool of the implement. Fixedly held on the other shaft journal 7 is a fan wheel 34 that conveys cooling air to the cooling ribs of the cylinder 2. The shaft journals 6, 7 are respectively rotatably mounted in the housing of the cylinder 2 via ball bearings 9.

Figure 2:
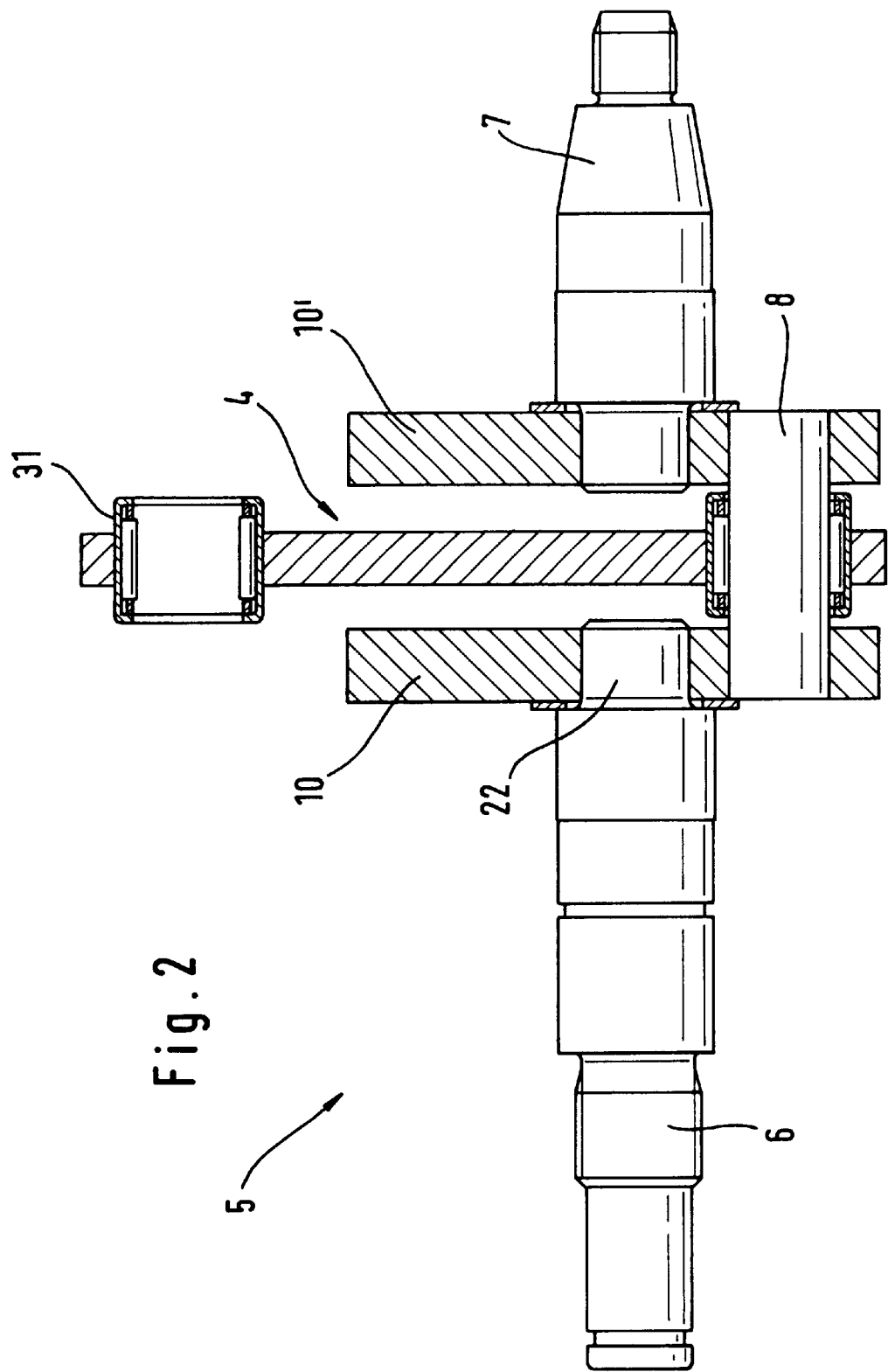
FIG. 2 is a view of a crankshaft composed of individual parts.

In FIG. 2, the fabricated crankshaft 5 is illustrated in detail, whereby for identical parts the same reference numerals are used as in FIG. 1. Insertion ends 22 of the shaft journals 6, 7 are respectively received in corresponding recesses or apertures of the separate crank arms 10, 10'. The dimensions of the insertion ends 22 and of the central recesses in the crank arms 10, 10' are coordinated with one another in accordance with tolerance requirements of a press fit, and the shaft journals 6, 7 are thus fixedly joined with the respectively associated crank arms 10, 10'. That end of the connecting rod 4 that is opposite the wrist pin 30 is mounted on the crankshaft pin 8 via a roller bearing or the like; the ends of the crankshaft pin are respectively received in the oppositely disposed crank arms 10, 10'.

Figure 3:
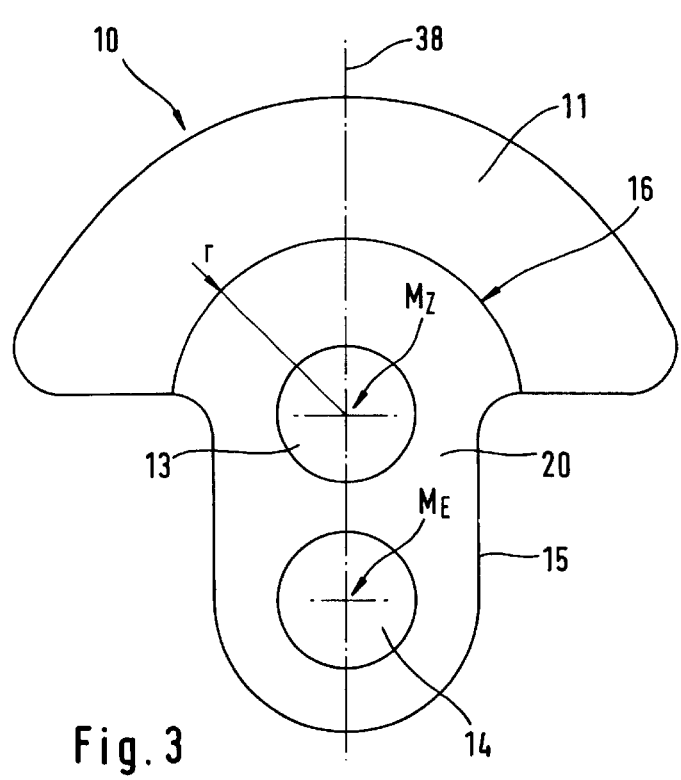
FIG. 3 is a plan view of one exemplary embodiment of an inventive stamped crank arm.

The crank arm 10, which is shown in plan in FIG. 3, is produced as a stamped metal part. On that side of the central recess or aperture 13 for the shaft journals, which side is disposed opposite the eccentric recess or aperture 14 for receiving the crankshaft pin, the stamped-out contour 15 of the crank arm 10 delimits a flywheel member 11. The crank arm 10 is mirror symmetric relative to an axis of symmetry 38, which extends through the center point $M_Z$ of the central recess 13 and through the center point $M_E$ of the eccentric recess 14. The somewhat mushroom-shaped contour 15 of the crank arm 10 extends in the outer region of the flywheel member 11 essentially radially relative to the central recess 13 and furthermore extends over an arc of 160°. At the outer ends of the flywheel member 11, the contour 15 is narrowed down relative to the axis of symmetry 38, as a result of which the crank arm 10, in the region of the flywheel member 11, for an optimum counterbalancing has a considerably greater width than in the region of the recesses 13, 14.

Pursuant to the present invention, in the peripheral region of the central recess 13, a recessed surface portion 20 is formed, for example by stamping, in the crank arm 10, with the rim 16 of the recessed surface portion extending radially with the radius r about the center point $M_Z$ of the central recess 13. As shown in the cross-sectional illustration of the crank arm of FIG. 4, the recessed surface portion 20 embraces both of the recesses and extends to that end of the crank arm 10 that is adjacent to the eccentric recess 14. The radial rim 16 of the recessed surface portion 20 intersects the contour of the crank arm 10, as a result of which the stamped portion is delimited by the radial rim 16 and the portion of the contour 15 between the points of intersection with the radial rim 16. Due to this stamping, in the portion 20 with its recessed surface the crank arm 10 has a lesser thickness than in the region of the flywheel member 11, where the stamped crank arm 10 has the thickness of the semifinished steel part. In the illustrated embodiment, the recessed portion 20 is provided on one of the side surfaces 21 of the crank arm 10, whereby it can also be expedient to provide the opposite side surface 21' with a recessed portion.

Due to the depth of the recessed surface 20 relative to the surface in the region of the flywheel member 11, with the same geometry of a comparable crank arm the moment of inertia of the crank arm 10 can be selected. To increase the ratio between the moment of inertia and the weight of the crank arm 10, the depth of the recessed portion is appropriately increased. As a consequence of the shape of the recessed portion 20, it is additionally possible to influence the moment of inertia of the crank arm 10 and in particular the balancing of the crank arm 10. For example, by adjusting the plane of the recessed surface portion 20 relative to the longitudinal plane of the crank arm 10, the material accumulation can be enhanced in regions of the crank arm 10 radially remote from the axis of rotation 12. For the purpose of balancing, surface portions that are recessed to a greater or lesser depth can be provided at suitable angular positions.

The stamped crank arm 10 is advantageously provided in its radially outwardly disposed peripheral surface 19 with a chamfer 18 into which, in the lower dead center position of the piston, the skirt of the reciprocating piston can engage, so that a very compact construction can be achieved with the fabricated crankshaft. In this connection, the chamfer 18 faces the backside 21' of the crank arm 10, which back side is disposed opposite the front side 21 with its recessed surface portion 20.

The central recess 13 for receiving the shaft journal is provided with a beveling 23, so that during assembly the shaft journal, which is to be received with press fit, can be more easily introduced.

Figure 6:
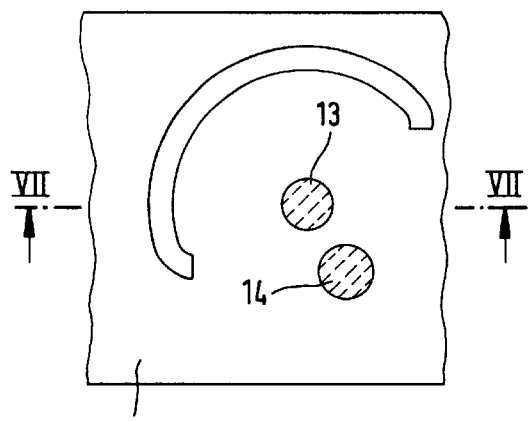
FIG. 6 is a plan view of a portion of a sheet-metal strip having stamped-out portions of the crank arm.

FIGS. 6 to 11 illustrate the manufacture of the crank arm as a stamped part from a sheet-metal strip 17. In this connection, stamping-out of the crank arm is effected in a three-stage, stamping process. FIG. 6 is a plan view upon a sheet-metal strip 17 that is processed in three successive operating steps pursuant to FIGS. 6, 8 and 10 and the corresponding longitudinal cross sections of FIGS. 7, 9, and 11.

Figure 4:
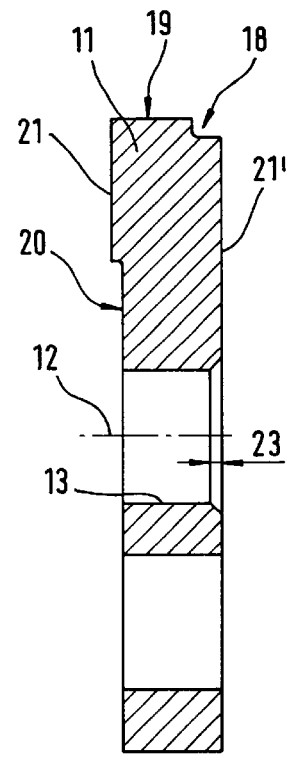
FIG. 4 is a cross-sectional view of the crank arm of FIG. 3.
Figure 5:
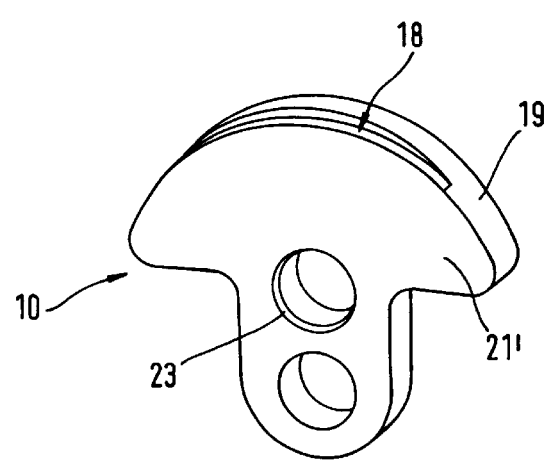
FIG. 5 is a perspective view of the stamped-out crank arm.
Figure 7:
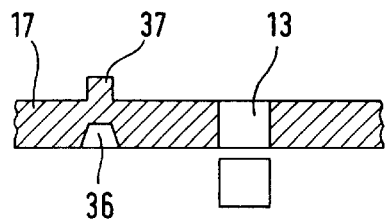
FIG. 7 is a cross-sectional view of the sheet-metal strip with stamped-out portions for a crank arm taken along the line VII—VII in FIG. 6.

In the first stamping step of FIGS. 6 and 7, the recesses 13, 14 for receiving a shaft journal or crankshaft pin respectively are stamped out of the sheet-metal strip 17. In so doing, at the same time the outwardly disposed radial contour of the flywheel member is pressed into the sheet-metal strip. The pressed-in portion 36 extends appropriately over the prescribed arc for the flywheel member of the finished crank arm, whereby due to the pressed-in portion 36 in the sheet-metal strip, a pressed-out portion 37 projects from the opposite side of the strip 17. The pressed-in portion 36 is introduced in sections with wedge-shaped side walls in the sheet-metal strip 17. During the final stamping of the crank arm in the stamping step of FIGS. 10 and 11, the sheet-metal strip is severed at the level of the inwardly disposed wall of the wedge shape, as a result of which the wedge-shaped pressed-in portion in the periphery of the crank arm leaves behind the chamfer 18 (FIGS. 4 and 5).

Figure 9:
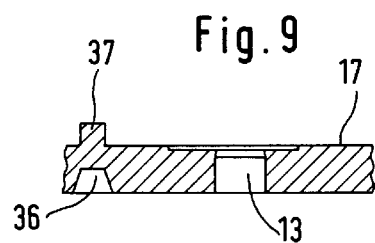
FIG. 9 is a cross-sectional view taken through the sheet-metal strip portion along the line IX—IX in FIG. 8.
Figure 11:
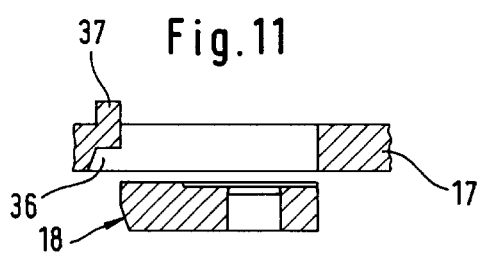
FIG. 11 is a cross-sectional view taken through the sheet-metal strip along the line XI—XI in FIG. 10.
Figure 8:
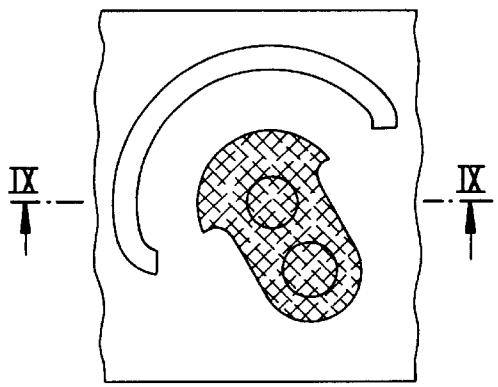
FIG. 8 is a plan view of the sheet-metal strip after a stamping operation.
Figure 10:
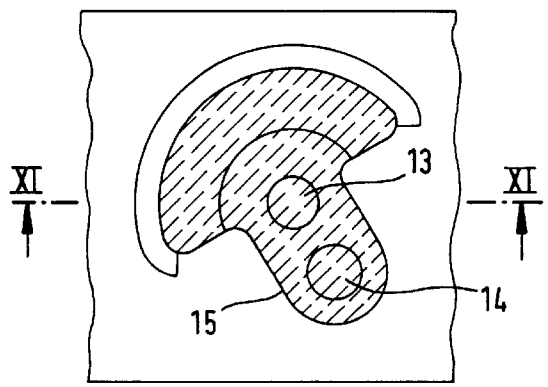
FIG. 10 is a plan view of the sheet-metal strip portion after conclusion of manufacture.

After the stamping operation in the method step of FIGS. 6 and 7, there is effected a stamping operation in accordance with FIGS. 8 and 9, according to which a portion having a recessed surface is formed in the sheet-metal strip 17. In so doing, as illustrated with the double cross-hatching, a surface portion is formed in the sheet-metal strip that corresponds approximately to the prescribed outer contour of the crank arm. During the subsequent stamping operation in the operating step of FIGS. 10 and 11, the stamping-out of the recesses 13 and 14 is repeated prior to the stamping-out of the contour 15 of the crank arm. To the extent that during the forming or stamping operation of FIGS. 8 and 9 the cross-sectional areas of the recesses 13 and 14 are narrowed by displaced material, the recesses obtain their prescribed dimensions by repeating the stamping of the holes or recesses.

The specification incorporates by reference the disclosure of German priority document 101 19 161.8 filed Apr. 19, 2001.

The present invention is, of course, in no way restricted to the specific disclosure of the specification and drawings, but also encompasses any modifications within the scope of the appended claims.

We claim:

1. A method of producing a crank arm for a crankshaft of an internal combustion engine, wherein the crankshaft is composed of separately produced parts, said method including the steps of:

stamping said crank arm from a semifinished part such that said crank arm has a central recess for receiving a shaft journal of said crankshaft, and an eccentrically disposed recess for receiving a crankshaft pin, and such that said crank arm has a peripheral contour that, on a side of said central recess opposite said eccentrically disposed recess, delimits a flywheel member; and stamping in said crank arm, in an area surrounding said central recess, a recessed surface portion.

2. A method according to claim 1, including the step of stamping said recesses with prescribed dimensions after said stamping of said recessed surface portion.

3. A method according to claim 1, including the step of stamping out said central recess and said eccentrically disposed recess prior to stamping of said recessed surface portion, and again stamping out said recesses subsequent to said stamping step.

4. A method according to claim 1, including stamping said crank arm to be mirror symmetrical relative to an axis of symmetry that extends through center points of said recesses.

5. A method according to claim 1, including the step of determining the shape of said recessed portion of said crank arm taking into consideration a desired balancing of said crank arm and the effect thereof upon an operating behavior of said internal combustion engine.

6. A method according to claim 1, including providing a rim of said recessed surface portion that extends essentially radially relative to a center point of said central recess.

7. A method according to claim 6, including causing said rim of said recessed portion to intersects said peripheral contour of said crank arm, and causing said recessed surface portion to extends over a surface delimited by said peripheral contour between points of intersection thereof with said rim.

8. A method according to claim 1, including stamping opposite sides of said crank arm.

9. A method according to claim 1, including providing at least portions of an outwardly disposed peripheral surface of said flywheel member with a chamfer on one side surface of said crank arm.

10. A method according to claim 9, including forming said chamfer on that side surface of said crank arm that is disposed opposite a side that is provided with said recessed portion.

11. A method of producing a crank arm for a crankshaft of an internal combustion engine, wherein the crankshaft is composed of separately produced parts, said method including the steps of:

stamping said crank arm from a semifinished part such that said crank arm has a central recess for receiving a shaft journal of said crankshaft, and an eccentrically disposed recess for receiving a crankshaft pin, and such that said crank arm has a peripheral contour that, on a side of said central recess opposite said eccentrically disposed recess, delimits a flywheel member; and stamping in said crank arm, in an area surrounding said central recess, a recessed surface portion, wherein said stamping of said recessed surface portion is effected prior to stamping of said peripheral contour of said crank arm.

* * * * *